US008299755B2

United States Patent
Shiu et al.

(10) Patent No.: US 8,299,755 B2
(45) Date of Patent: *Oct. 30, 2012

(54) BATTERY BALANCE CHARGING CONTROLLER FOR MAKING ONE BATTERY HAVING LOWER VOLTAGE OUT OF BATTERIES CONNECTED IN SERIES TO RECEIVE GREATER CHARGING CURRENT AND BATTERY CHARGING CONTROLLING APPARATUS USING THE SAME

(75) Inventors: Shian-Sung Shiu, Taipei County (TW);
Chung-Che Yu, Taipei County (TW);
Li-Min Lee, Taipei County (TW)

(73) Assignee: Green Solution Technology Co., Ltd., New Taipei (TW)

( * ) Notice: Subject to any disclaimer, the term of this patent is extended or adjusted under 35 U.S.C. 154(b) by 695 days.

This patent is subject to a terminal disclaimer.

(21) Appl. No.: 12/484,259

(22) Filed: Jun. 15, 2009

(65) Prior Publication Data

US 2010/0201317 A1 Aug. 12, 2010

(30) Foreign Application Priority Data

Feb. 10, 2009 (TW) .............................. 98104116 A (51) Int. Cl.
*H02J 7/00* (2006.01)
(52) U.S. Cl. ....................................... 320/116; 320/120
(58) Field of Classification Search .................. 320/116, 320/118, 119, 120, 124, 135; 307/41
See application file for complete search history.

(56) References Cited

U.S. PATENT DOCUMENTS

2005/0127873 A1* 6/2005 Yamamoto et al. ........... 320/116
2009/0102421 A1* 4/2009 Imai .............................. 320/118
2009/0315515 A1* 12/2009 Yu et al. ........................ 320/116

FOREIGN PATENT DOCUMENTS

CN 201122645 9/2008

OTHER PUBLICATIONS

"First Office Action of China Counterpart Application", issued on Aug. 25, 2011, p. 1-p. 6.

* cited by examiner

*Primary Examiner* — Jay Patidar
(74) *Attorney, Agent, or Firm* — Jianq Chyun IP Office (57) ABSTRACT

A battery charging controlling apparatus for balancing voltages of the charged batteries is provided. The battery charging controlling includes a battery reference voltage generating unit, a voltage balancing unit, and a balance judging unit. The battery charging controlling apparatus determines whether a battery voltage difference between any two adjacent battery units of a battery module is too large or not by using a reference voltage provided from the battery reference voltage generating unit. The battery charging controlling apparatus further detects the voltage of the battery module and a charging current thereto to determine a suitable time for balancing the charged batteries. Then, the voltage balancing unit controlled by the balance judging unit allows the charging current of the lower-voltage battery unit greater than the charging current of the higher-voltage battery, unit so as to lower the battery voltage difference of the battery units.

28 Claims, 6 Drawing Sheets

BATTERY BALANCE CHARGING CONTROLLER FOR MAKING ONE BATTERY HAVING LOWER VOLTAGE OUT OF BATTERIES CONNECTED IN SERIES TO RECEIVE GREATER CHARGING CURRENT AND BATTERY CHARGING CONTROLLING APPARATUS USING THE SAME

CROSS-REFERENCE TO RELATED APPLICATION

This application claims the priority benefit of Taiwan application serial no. 98104116, filed on Feb. 10, 2009. The entirety of the above-mentioned patent application is hereby incorporated by reference herein and made a part of specification.

BACKGROUND OF THE INVENTION

1. Field of the Invention

The present invention relates to a battery charging controlling apparatus and battery balance charging controller, and more particularly, to the battery balancing charging controller for balancing battery charging and the battery charging controlling apparatus using the battery balance charging controller.

2. Description of Related Art

With development of portable electronic products, there is a growing need of chargeable batteries. The chargeable batteries include conventional nickel-cadmium battery, later-developed Nickel-hydrogen battery, Lithium (Li) ion battery, and the latest-developed Li-Polymer battery. Different kinds of chargeable batteries may provide different voltages, and operating voltages required by portable electronic products may also be different as well. Therefore, battery manufacturers may make several battery connected in series to form a battery module in accordance with the operating voltages of the portable electronic products.

The battery module is required to be recharged by a charger for use of next time when an electric energy of the battery is exhausted. However, the battery module may have different electric storage capacity due to manufacturing error or using. For example, a Li ion battery module of 7.4 Volts (V) is composed of two Li ion battery of 3.7 V connected in series. At the time of shipment from a factory, the electric storage capacity of the two Li ion battery are 80% and 70% respectively. Due to over-charging the Li ion battery may damage the battery itself, a charger for the Li ion battery terminates charging when any one of the Li ion batteries is fully charged. At this moment, the electric capacity of the two Li ion batteries may be 100% (the upper limit of charging the Li ion battery) and 90%. On the other hand, when the electric capacity of any one of the Li ion batteries is lowered to 0% (the lower limit of discharging the Li ion battery) during operation, the battery module is not usable. As a result, at this moment, the electric capacity of the two are lowered to be 10% and 0%, and the Li ion batteries require to be charged again before the next time of use.

As may be understood from the above-described example, when the electric capacities of batteries of the battery module are different, actual usable electric energy from the battery module may be determined by a battery with a lowest electric capacity. In addition to the above-described example of different electric capacity of each battery of the battery module at the time of shipment, the batteries may discharge by self-discharge when the batteries is not used and the discharging rates of the batteries may be different, such that the electric capacity between the batteries may gradually become unbalanced. It results in the actual usable electric energy of the battery module decreasing along with the utilization of the batteries and then shortening utilization duration of the battery module.

Figure 1:
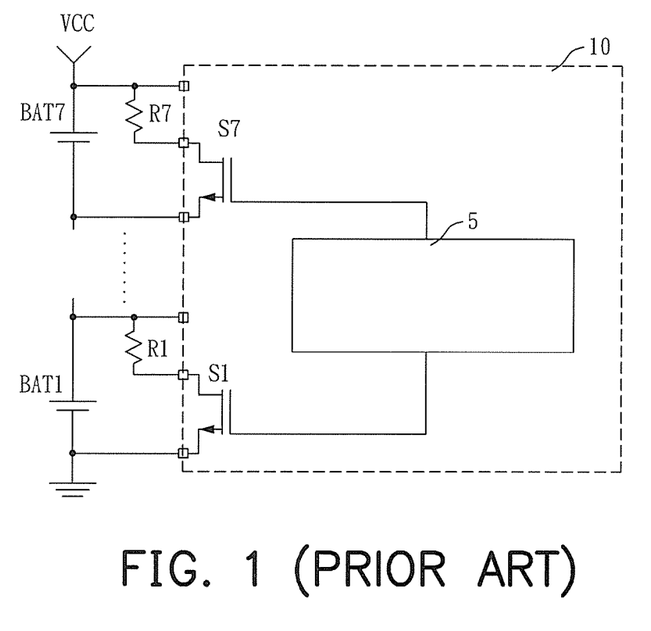
FIG. 1 is a schematic diagram illustrating a circuit of a conventional digital battery balancing controller.

Referring to FIG. 1, this is a digital battery balance controller disclosed in a datasheet of the Intersil ISL9208. A digital battery balance controller 10 include a battery balance microprocessor 5 and transistor switches S1~S7. The transistor switches S1~S7 are respectively connected in parallel with batteries BAT1~BAT7 via resistors R1~R7. Voltage levels of the batteries BAT1~BAT7 are converted via an analog/digital converter (A/D converter) to digital signals. Then, the battery balance controller microcontroller 5 determines which battery has a higher voltage by executing a built-in algorithm based on the digital signals indicative of the voltage levels of the batteries BAT1~BAT7, and thus conducts the transistor switch connected in parallel with the battery of the higher voltage. Therefore, charging current of each battery can be adjusted according to the voltage of each of the batteries so as to achieve functionality of balancing charging.

However, the battery voltages are required to be transformed to digital signals via the A/D converter for the digital battery balance microcontroller 5 processing. The A/D converter may substantially increase chip area of the digital battery balance controller 10, and so relatively high cost is a disadvantage to this approach. In addition, the digital battery balance microcontroller 5 may be limited to original design, for example, ISL9208 may only support a battery module with 5 to 7 batteries, application scope of the digital battery balance controller may be limited as a result.

SUMMARY OF THE INVENTION

Accordingly, due to the cost of the digital battery balance controller being too high, the present invention utilizes an analog battery charging controller apparatus to achieve balancing charging of the batteries. Since an analog determination circuit has relatively smaller chip area compared with the A/D converter, the analog battery charging controller apparatus has a substantial cost advantage, and also may be arranged with the battery module with different quantities of the batteries. Hence, the analog battery charging controller apparatus according to the present invention has a wider application scope. In addition, the present invention further utilizes detection of battery voltages and charging current to achieve promoting efficiency of battery voltage balance and protecting batteries from an inappropriate battery voltage balance operation.

In order to achieve the above-described objectives, the present invention provides a battery balance charging controller, adapted to balance a charging of a first battery and a second battery, wherein a negative terminal of the first battery is connected with a positive terminal of the second battery to form a connection point, a positive terminal of the first battery forms a first terminal, a negative terminal of the second battery forms a second terminal. The battery balance charging controller includes a battery reference voltage generating unit, a voltage balancing unit, and a balance judging unit. The battery reference voltage generating unit is adapted to provide a first set of battery balancing determination signals and a second set of battery balancing determination signals, wherein the first set of battery balancing determination signals includes an up high reference voltage level, and the second set of battery balancing determination signals includes a down low reference voltage level. The voltage balancing unit includes a first balancing electric current unit and a second balancing electric current unit, wherein the first balancing electric current unit is coupled to the first terminal and the connection point, and the second balancing electric current unit is coupled to the second terminal and the connection point. The balance judging unit, coupled to the connection point, the battery reference voltage generating unit, and the voltage balancing unit, controls the voltage balancing unit when an voltage level of the connection point is higher than the up high reference voltage level or the voltage level of the connection point is lower than the down low reference voltage level, so as to make one of the first battery and the second battery, which has a lower voltage level, to receive a greater charging current.

The present invention further provides battery charging controlling apparatus, adapted to charge a battery module comprising a plurality of battery units connected in series, wherein the battery charging controlling apparatus is coupled to a positive terminal and a negative terminal of each of the battery unit. The battery charging controlling apparatus includes a battery charging controlling unit and a battery balance charging controlling unit. The battery charging controlling unit is adapted to control a charging current of the battery module, according to a battery current detection signal and a battery voltage detection signal. Beside, the battery balance charging controlling unit, coupled to the every positive terminal and the every negative terminal of the battery unit so as to determine a voltage difference between any two adjacent battery units of the battery module and execute a balance charging control to adjust magnitude of the charging current of the two battery units when the voltage difference between any two adjacent battery units of the battery module is higher than a first preset value and lower than a second preset value, so as to make the charging current of the battery unit with a lowest voltage level greater than the charging current of the battery unit with a highest voltage level.

In order to make the features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 2:
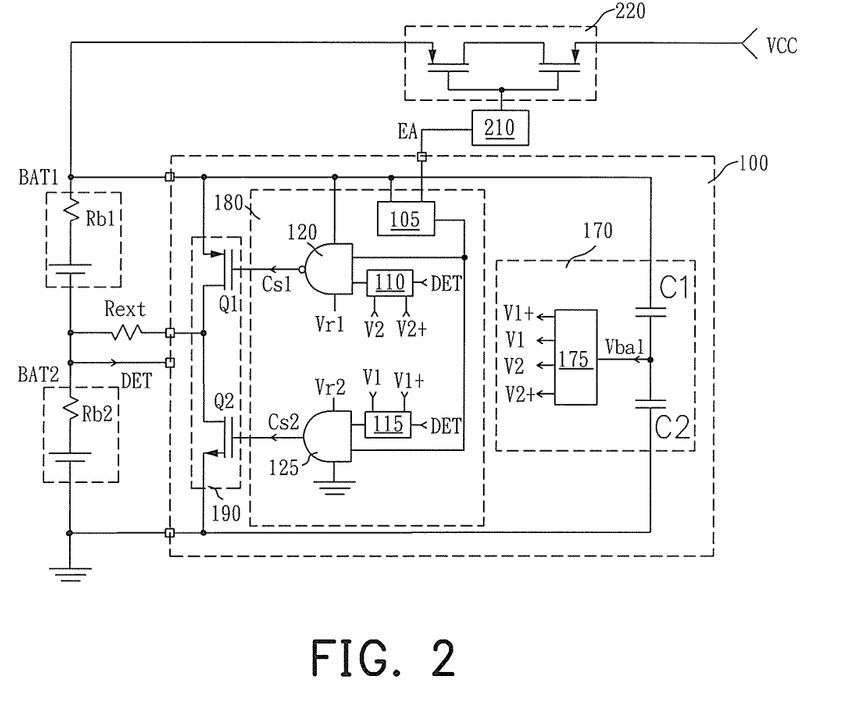
FIG. 2 is a schematic diagram illustrating a circuit of a battery balance charging controller according to a first preferred embodiment of the present invention.

FIG. 2 is a schematic diagram illustrating a circuit of a battery balance charging controller according to a first preferred embodiment of the present invention. Referring to FIG. 2, the battery balance charging controller 100 is adapted to balance charging of a first battery BAT1 and a second battery BAT2, and includes a battery reference voltage generating unit 170, a balance judging unit 180, and a voltage balancing unit 190. A negative terminal of the first battery BAT1 and a positive terminal of the second battery BAT2 are electrically connected to form a connection point; a positive terminal of the first battery BAT1 is coupled to a protection switch module 220; and a negative terminal of the second battery BAT2 is connected to the ground. The first battery BAT1 includes a first battery internal resistance Rb1, and the second battery BAT2 includes a second battery internal resistance Rb2. One terminal of the protection switch module 220 is coupled to a charging source VCC. A battery charging controlling unit 210 controls whether to transmit a charging current from the charging source VCC to the first battery BAT1 and the second battery BAT2 for charging, or to transmit a discharging current from the first battery BAT1 and the second battery BAT2 to a load (not shown).

The battery reference voltage generating unit 170 provides a first set of battery balance determination signals and a second set of battery balance determination signals for a reference to determine whether to perform a balancing charging. The battery reference voltage generating unit 170 includes a first reference capacitor C1, a second reference capacitor C2, and a reference voltage generator 175. The first reference capacitor C1 and the second reference capacitor C2 are connected in series between the first battery BAT1 and the second battery BAT2, and which are of the same capacitance value, so an average voltage value Vbal of the connection point of the first reference capacitor C1 and the second reference capacitor C2 may be determined from an equation of Vbal=(Vbat1+Vbat2)/2, wherein Vbat1 is the voltage value of the first battery BAT1, and Vbat2 is the voltage value of the second battery BAT2. The reference voltage generator 175 is coupled to the connection point of the first reference capacitor C1 and the second reference capacitor C2 to provide the first set of battery balance determination signals and the second set of battery balance determination signals according to the average voltage value Vbal. The first set of battery balance determination signals includes an up high reference voltage level V1+ and an up low reference voltage level V1. The second set of battery balance determination signals includes a down high reference voltage level V2 and a down low reference voltage level V2+, wherein the up high reference voltage level V1+ is higher than the up low reference voltage level V1, and the down low reference voltage level V2+ is lower than the down high reference voltage level V2. The up high reference voltage level V1+ and the down low reference voltage level V2+ are utilized as a basis herein for determining whether to provide a balancing current to balance the voltages of the first battery BAT1 and the second battery BAT2. The up high reference electric voltage V1+ may be obtained by increasing a first preset percentage from the average voltage value Vbal and the down low reference voltage level V2+ may be obtained by decreasing the first preset percentage from the average voltage value Vbal, or alternatively, the up high reference voltage level V1+ may be obtained by increasing a first preset voltage value to the average voltage value Vbal, and the down low reference voltage V2+ may be obtained by decreasing the first preset voltage value from the average voltage value Vbal. For example, the first preset voltage may be 0.1V, as a result, when a voltage difference between the first battery BAT1 and the second battery BAT2 is greater than 0.2 V, the battery balance charging controller 100 would start providing the balancing current. A determination point for stopping providing the balancing current may be the average voltage value Vbal. Alternatively, as in this embodiment, the up low reference voltage level V1 and the down low reference voltage level V2 may be used as the determination point for stopping providing the balancing current. The up low reference voltage level V1 may be obtained by increasing a second preset percentage to the average voltage value Vbal and the down high reference voltage level V2 may be obtained by deceasing the second preset percentage from the average voltage value Vbal. Alternatively, the up low reference voltage level V1 may be obtain by increasing a second preset voltage value to the average voltage value Vbal and the down high reference voltage level V2 may be obtained by deceasing the second preset voltage value from the average voltage value Vbal. For example, take 0.05V as the second preset voltage, accordingly, when the voltage difference between the first battery BAT1 and the second battery BAT2 is smaller than 0.1V (i.e.: the voltage difference between the up low reference voltage level V1 and the down high reference voltage level V2 is V2−V1=0.05V*2=0.1V), the battery balance charging controller 100 may stop providing the balancing current. According to the above-described two examples, when the voltage difference between the first battery BAT1 and the second battery BAT2 is greater than 0.2V, the battery balance charging controller 100 of the present invention may activate the battery balancing until the voltage difference between the first battery BAT1 and the second battery BAT2 is less than 0.1V.

The voltage balancing unit 190 includes a first balancing current unit and a second balancing current unit. The first balancing current unit includes a first switch Q1, which is coupled to a positive terminal of the first battery BAT1 and the connection point of the first battery BAT1 and the second battery BAT2. Besides, the second balancing current unit includes a second switch Q2, which is coupled to a negative terminal of the second battery BAT2 and the connection point of the first battery BAT1 and the second battery BAT2. The voltage balancing unit 190 is controlled by the balance judging unit 180 to make the balance current flow through the first switch Q1 of the first balance current unit or the second switch Q2 of the second balance current unit.

The balance judging unit 180, coupled to the connection point of the first battery BAT1 and the second battery BAT2, the battery reference voltage generating unit 170 and the voltage balancing unit 190, includes an activation protection determiner 105, a first comparator 110, a second comparator 115, a NAND gate 120, and an AND gate 125. The first comparator 110 receives the down high reference voltage level V2, the down low reference voltage level V2+, and a connection point voltage signal DET on the connection point of the first battery BAT1 and the second battery BAT2. Besides, when the connection point voltage signal DET is lower than the down low reference voltage level V2+, the first comparator 110 outputs a high level signal until the connection point voltage signal DET is higher than the down high reference voltage level V2. The second comparator 115 receives the up high reference voltage level V1+, the up low reference voltage level V1, and the connection point voltage signal DET. In addition, when the connection point voltage signal DET is higher than the up high reference voltage level V1+, the second comparator 115 outputs a high level signal until the connection point voltage signal DET is lower than the up low reference voltage level V1.

The activation protection determiner 105 is coupled to a positive terminal of the first battery BAT1, and activates the battery balance charging controller 100 when the voltage of the positive terminal of the first battery BAT1 is higher than a preset voltage value. The activation protection determiner 105 may also be coupled to the battery charging controller unit 210, and activates the battery balance charging controller 100 when receiving an activation signal EA from the battery charging controller unit 210. The NAND gate 120 receives inputs of the activation protection determiner 105 and the first comparator 110, and then outputs a first control signal Cs1 for controlling a first switch Q1 of the voltage balancing unit 190. In order to prevent the NAND gate 120 from outputting a signal of a too low level and further damaging the first switch Q1, the NAND gate 120 may be connected to a voltage Vr1 as ground, which is higher than the voltage of the negative terminal of the second battery BAT2, so as to prevent the NAND gate 120 from outputting the signal of the too low level. The AND gate 125 receives inputs of the activation protection determiner 105 and the second comparator 115, and outputs a second control signal Cs2 in order to control the second switch Q2 of the voltage balancing unit 190.

After the activation protection determiner 105 activates the battery balance charging controller 100, if the voltage of the first battery BAT1 is higher than the voltage of the second battery BAT2, the connection point voltage signal DET is lower than the down low reference voltage level V2+. At this time, the NAND gate 120 outputs the first control signal Cs1 to turn on the first switch Q1, and so a portion of the charging current (i.e., the balancing current) provided by the charging source VCC flows through the first switch Q1 to have the charging current received by the first battery BAT1 of a higher voltage level less than the charging current received by the second battery BAT2 of a lower voltage level. Accordingly, the voltage of the second battery BAT2 with the lower voltage level increases at a higher rate with respect to the voltage of the first battery BAT1. When the voltage difference between the first battery BAT1 and the second battery BAT2 gets closer to a preset voltage difference, resulting in the connection voltage signal DET higher than the down high reference voltage level V2, the NAND gate 120 then stops outputting the first control signal Cs1, and the first switch Q1 is cut-off for terminating the balancing charging. Similarly, after the activation protection determiner 105 activates the battery balance charging controller 100, if the voltage of the second battery BAT2 is higher than the voltage of the first battery BAT1, the connection point voltage signal DET is higher than the up high reference voltage level V1+. The AND gate 125 outputs the second control signal Cs2 to turn on the second switch Q2 at this time, and so a portion of the charging current (i.e., the balancing current) provided by the charging source VCC conducting through the second switch Q2 to have the charging current received by the second battery BAT2 of the higher voltage level less than the charging current received by the first battery BAT1 of the lower voltage level. In order to prevent the AND gate 125 from outputting a signal of a too high level and further damaging the second switch Q2, the AND gate 125 may be connected to an operating voltage Vr2 which is lower than the voltage of the positive terminal of the first battery BAT1 so as to prevent the AND gate 125 from outputting the signal of the too high signal level. Accordingly, the voltage of the first battery BAT1 of the lower voltage increases at the higher rate with respect to the voltage of the second battery BAT2. When the voltage difference between the first battery BAT1 and the second battery BAT2 gets closer to the preset voltage difference, resulting in the connection voltage signal DET lower than the up low reference voltage level V1, the AND gate 125 then stops outputting the second control signal Cs2, and the second switch Q2 is cut-off for terminating the balancing charging. In other words, the balance judging unit 180 determines the voltage difference between the first battery BAT1 and the second battery BAT2 according to the connection voltage signal DET, the up high reference voltage level V1+, the up low reference voltage level V1, the down high reference voltage level V2, and the down low reference voltage level V2+. The balance judging unit 180 then controls the voltage balancing unit 190 when the voltage difference is higher than a voltage value, making one battery unit with a lower voltage level out of the first battery BAT1 and the second battery BAT2 to receive a greater charging current.

Furthermore, a resistor Rext may be coupled to the connection point of the first battery BAT1 and the second battery BAT2 so as to control the magnitude of the balancing current, preventing the balancing current of a too large magnitude from damaging the voltage balancing unit 190, the first battery BAT1, the second battery BAT2, and other components.

Figure 3:
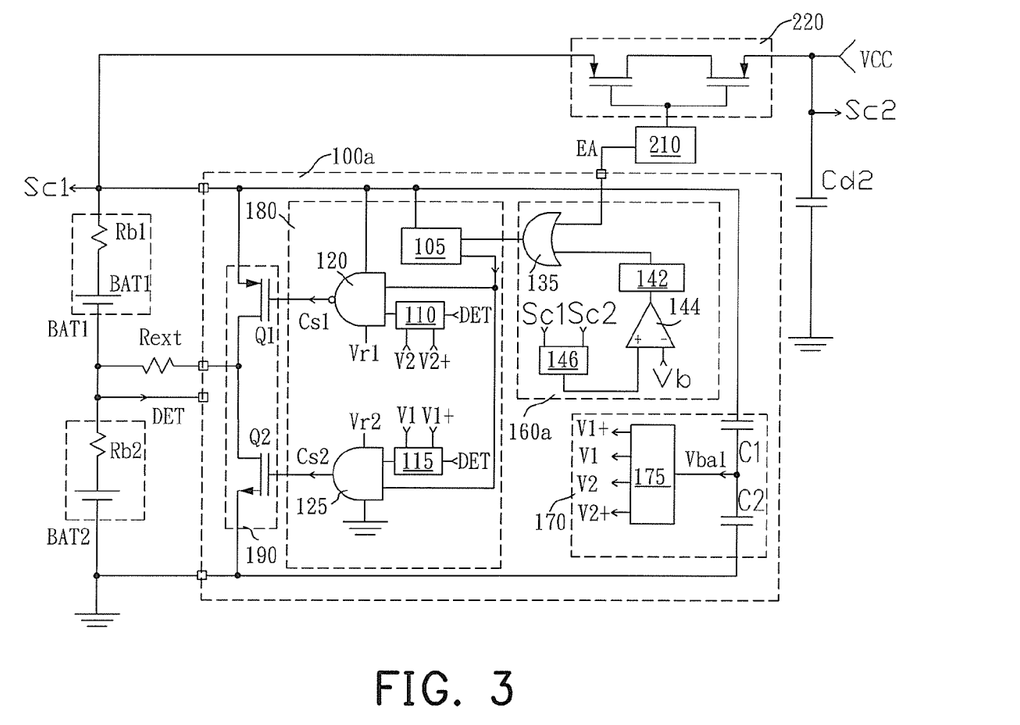
FIG. 3 is a schematic diagram illustrating a circuit of a battery balance charging controller according to a second preferred embodiment of the present invention.

Referring to FIG. 3, FIG. 3 is a schematic diagram illustrating a circuit of a battery balance charging controller according to a second preferred embodiment of the present invention. Compared with the embodiment illustrated in FIG. 2, the battery balance charging controller of the present embodiment illustrated in FIG. 3 may determine whether the battery module is in a charging process, and perform the balancing charging just during the charging process. Therefore, a battery balance charging controller 100a of this embodiment may further include a charging protection unit 160a, which is coupled between two terminals of the protection switch module 220 and adapted for detecting whether there is a charging current flow through the protection switch module 220. The charging protection unit 160a includes a voltage difference processing unit 146, a first charging comparator 144, an one shot circuit 142, and an OR gate 135. The voltage difference processing unit 146 is coupled to the two terminals of the protection switch module 220, so as to receive voltage signals Sc1 and Sc2 of the two terminals respectively, and outputs a voltage difference of the two voltage signals Sc1 and Sc2 as a charging current signal after a subtraction operation. The first charging comparator 144 compares the charging current signal and a reference voltage signal Vb, and outputs a high level signal when the charging current signal is higher than the reference voltage signal Vb, representing that the charging current is greater then a preset charging current value. At this time, the one shot circuit 142 may also generate a high level output signal due to a trigger from the first charging comparator 144. The OR gate 135 receives the high level output signal of the one shot circuit 142 and triggers the activation protection determiner 105 so as to activate the battery balance charging controller 100a.

As mentioned in the above-described embodiment, when a charging current flow through the protection switch module 220 from the charging source VCC to charge the first battery BAT1 and the second battery BAT2, as long as the charging current is large enough to make the voltage signal Sc2 higher than the voltage Sc2 by a preset voltage difference, the battery balance charging controller 100a is then activated so as to ensure a battery voltage balancing process executing just during the charging process.

Figure 4:
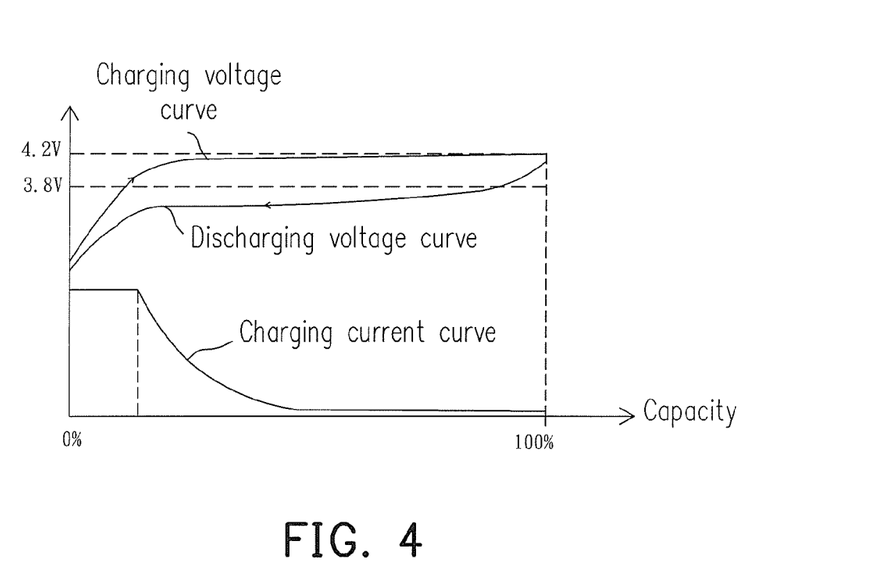
FIG. 4 is a schematic diagram illustrating a charging and discharging voltage curve and a charging current curve of a Li ion battery cell.

Next, referring to FIG. 4, FIG. 4 is a schematic diagram illustrating a charging and discharging voltage curves and a charging current curve of a Li ion battery cell. As may be discovered from FIG. 4, during an initial period of a charging process, the battery voltage rises quite quickly, and a charging mode at this time is a constant current charging mode. When the battery voltage later on gets quite close to a rated voltage of 4.2V (a Li ion battery using graphite as an anode electrode is taken as an example herein), the charging mode is changed to a constant voltage charging mode, with a rise of a capacity of the battery, the battery voltage just rises slowly until the battery reaches a full capacity, 100%. On the other hand, during an initial period of a discharging process, first the battery voltage falls quickly and then the battery voltage is changed to fall slowly. When the electric capacity of the battery just remains a small portion through the discharging process, the battery voltage may fall quickly until the discharging process terminates. Therefore, as illustrated in FIG. 4, in which a 3.8V is taken as a determination of the charging process or the discharging process, a portion of the discharging process, i.e., when the electric capacity of the battery reaches 100%, and the most of charging process may be determined. Surely, in addition to the above-described charging method of constant current constant voltage, Li ion battery may be charged by a charging method of constant voltage constant current or other charging methods, and a corresponding relationship between the battery voltage and the electric capacity is still similar to the charging method of the constant current constant voltage.

Figure 5:
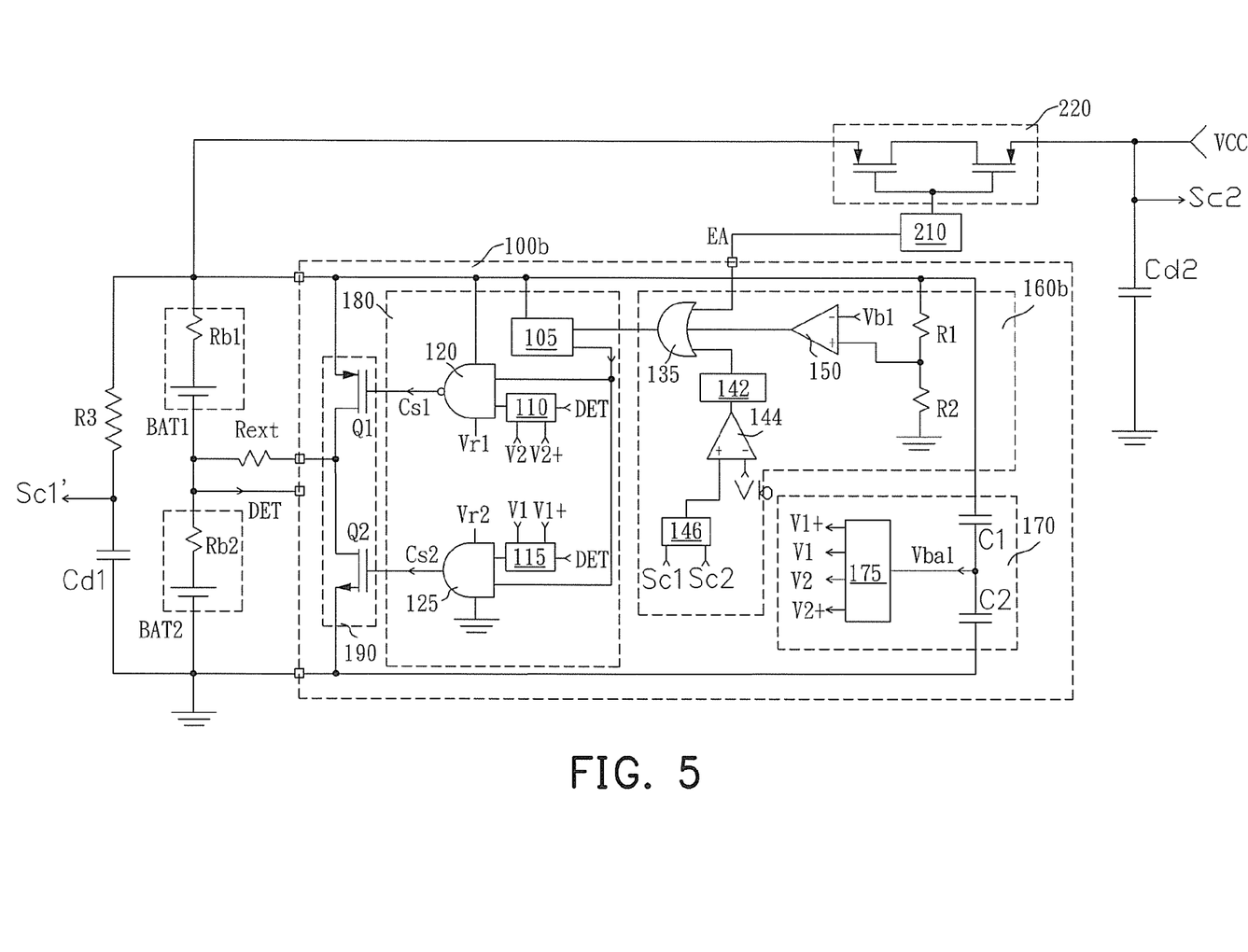
FIG. 5 is a schematic diagram illustrating a circuit of a battery balance charging controller according to a third preferred embodiment of the present invention.

Due to a drain-source on-resistance Rds (on) of the protection switch module 220 is generally not too large, the embodiment illustrated in FIG. 3 could not detect a smaller charging current easily. As a result, the present invention may determine whether the battery module is in the charging mode or in the discharging mode through difference of characteristics of the battery voltages between the charging mode and the discharging mode in the above-described Li ion battery. Referring to FIG. 5, FIG. 5 is a schematic diagram illustrating a circuit of a battery balancing charging controller according to a third preferred embodiment of the present invention. Compared with the embodiment illustrated in FIG. 3, a charging protection unit 160b of the present embodiment further includes a second charging comparator 150, a first resistor R1, and a second resistor R2. The first resistor R1 and the second resistor R2 are coupled together in series between the positive terminal of the first battery BAT1 and the negative terminal of the second battery BAT2, so as to detect a sum of the battery voltages of the two batteries and generate a battery voltage detection signal. Besides, the second charging comparator 150 compares the battery voltage detection signal and a first reference signal Vb1, and generates a high level output signal when the battery voltage detection signal is higher than the first reference signal Vb1 (i.e., a voltage sum of the two batteries is higher than a preset activation voltage), so as to trigger the activation protection determiner 105 to activate the battery balance charging controller 100b. Furthermore, a voltage signal Sc1' is generated by a filter circuit, which includes a third resister R3 and a filter capacitor Cd1, and is coupled between the positive terminal of the first battery BAT1 and the negative terminal of the second battery BAT2. Through the filter circuit, during the initial period of the battery charging process, the voltage level of the positive terminal of the first battery BAT1 is risen due to the charging current flowing through the internal resistor Rb1 of the first battery BAT1 and the internal resistor Rb2 of the second battery BAT2. However, at this time, the voltage signal Sc1' is maintained for a period of time around an voltage level of the positive terminal of the first battery BAT1 before charged due to a large resistance of the third resistor R3.

As illustrated in FIG. 4, a 7.6V or a greater voltage may be used as a determination voltage of the charging mode and the discharge mode in the above-describe embodiment, and the battery balance charging controller 100b then may be activated during the most of charging process and in a portion of discharging process when the electric capacity gets close to 100%. In order to avoid judgment error due to a slight unbalance of the battery voltages between two batteries, a preferred determination voltage level may be 7.8V or even greater. In addition, further with a determination of the charging current, the battery balance charging controller 100b may almost be activated to carry out a battery voltage balance during the whole charging process. As for the portion of the discharging process when the electric capacity gets close to 100%, since the battery balance charging controller 100b is just activated at a high capacity, the electric capacity of the battery would not be over-consumed because of the battery voltage balance process of the battery balance charging controller 100b.

Figure 6:
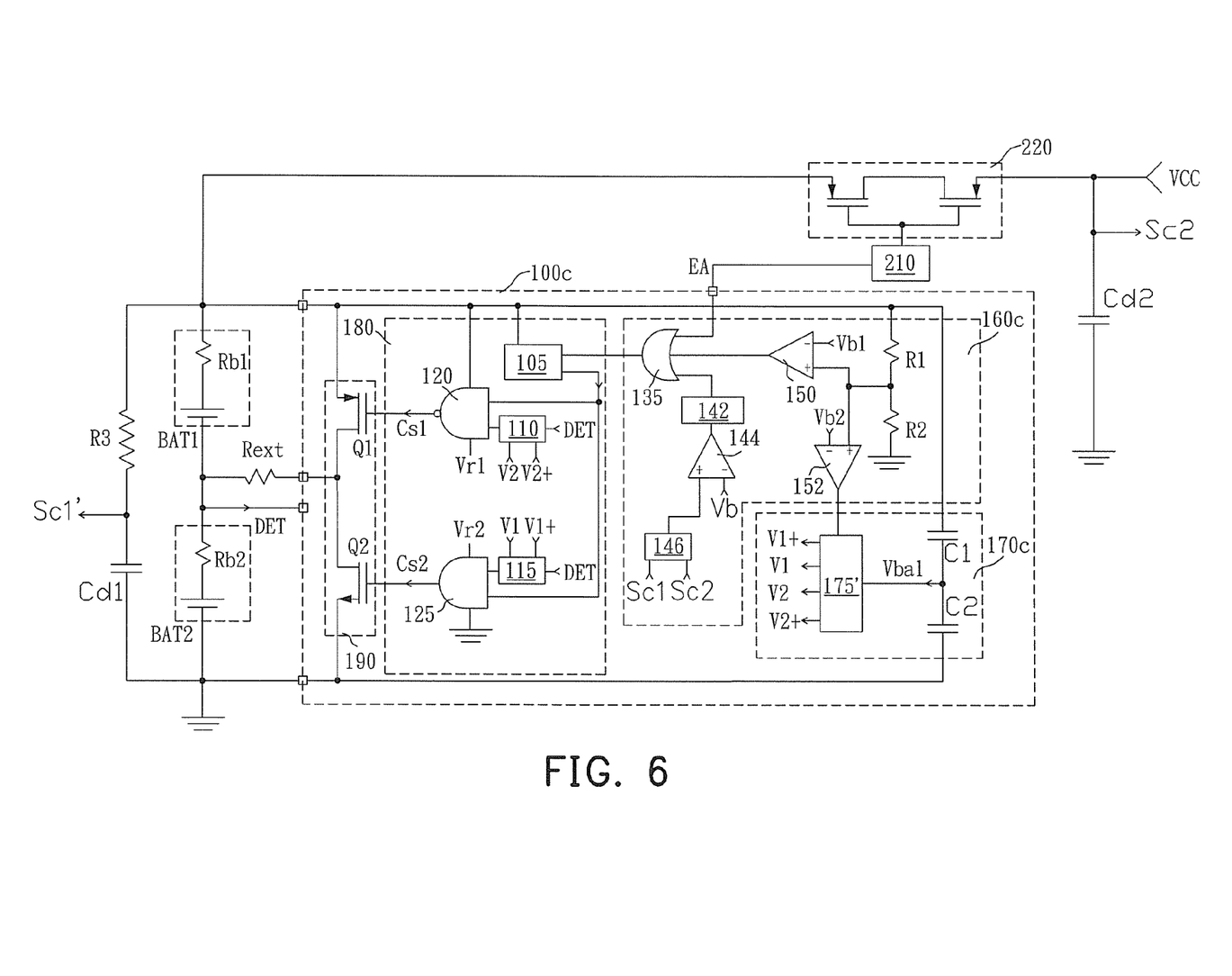
FIG. 6 is a schematic diagram illustrating a circuit of a battery balance charging controller according to a fourth preferred embodiment of the present invention.

Besides, if the voltage difference between the first battery BAT1 and the second battery BAT2 is too large, this means that one of the batteries has too low battery voltage due to a too high battery internal resistance or there are other problems. In such situation, if the voltage sum of the first battery BAT1 and the second battery BAT2 connected in series has still reached 7.8V or even greater, but it is still not appropriate to perform the battery voltage balance process in case that the other battery having the higher battery voltage is discharged for reducing the battery voltage to achieve balancing the voltage difference of the two batteries. Referring to FIG. 6, FIG. 6 is a schematic diagram illustrating a circuit of a battery balance charging controller according to a fourth preferred embodiment of the present invention. Compared with the embodiment illustrated by FIG. 5, a charging protection unit 160c further includes a third charging comparator 152, which receives the battery voltage detection signal generated from the first resistor R1 and the second resistor R2, and receives a preset adjustment voltage Vb2, wherein the preset adjustment voltage Vb2 is higher than the first reference signal Vb1. When the battery voltage detection signal falls between the first reference signal Vb1 and the preset adjustment voltage Vb2, the third charging comparator 152 generates a low level output signal to a reference voltage generator 175' of a battery reference generator unit 170c. At this time, the reference voltage generator 175' outputs the down low reference voltage level V2+ and the up high reference voltage level V1+, which are farther from the average voltage value Vbal, so as to make the triggering condition of the battery voltage balance process of the battery balance charging controller 100c higher. In other words, a triggering sensitivity of the battery balance charging controller 100c is lower for preventing a possible inappropriate battery voltage balance. Furthermore, the reference voltage generator 175' may also make the up low reference voltage level V1 and the down high reference voltage level V2 farther from the average voltage value Vbal, so as to limit a power loss of the electric capacity to a smaller range in case that the battery balance charging controller 100c still conducts an inappropriate battery voltage balance. When the battery voltage detection signal is higher than the preset adjustment voltage Vb2 due to the first battery BAT1 and the second battery BAT2 are charged, the third charging comparator 152 generates an adjustment signal of a high level to the reference voltage generator 175', and the reference voltage generator 175' may then adjust the down low reference voltage level V2+, the down high reference voltage level V2, the up high reference voltage level V1+, and the up low reference voltage level V1 closer to the average voltage value Vbal, so as to carry out a more accurate battery voltage balancing. Accordingly, some possible risks may be prevented by two stages of battery voltage balance so as to enhance effectiveness and safety of the battery voltage balancing.

Figure 7:
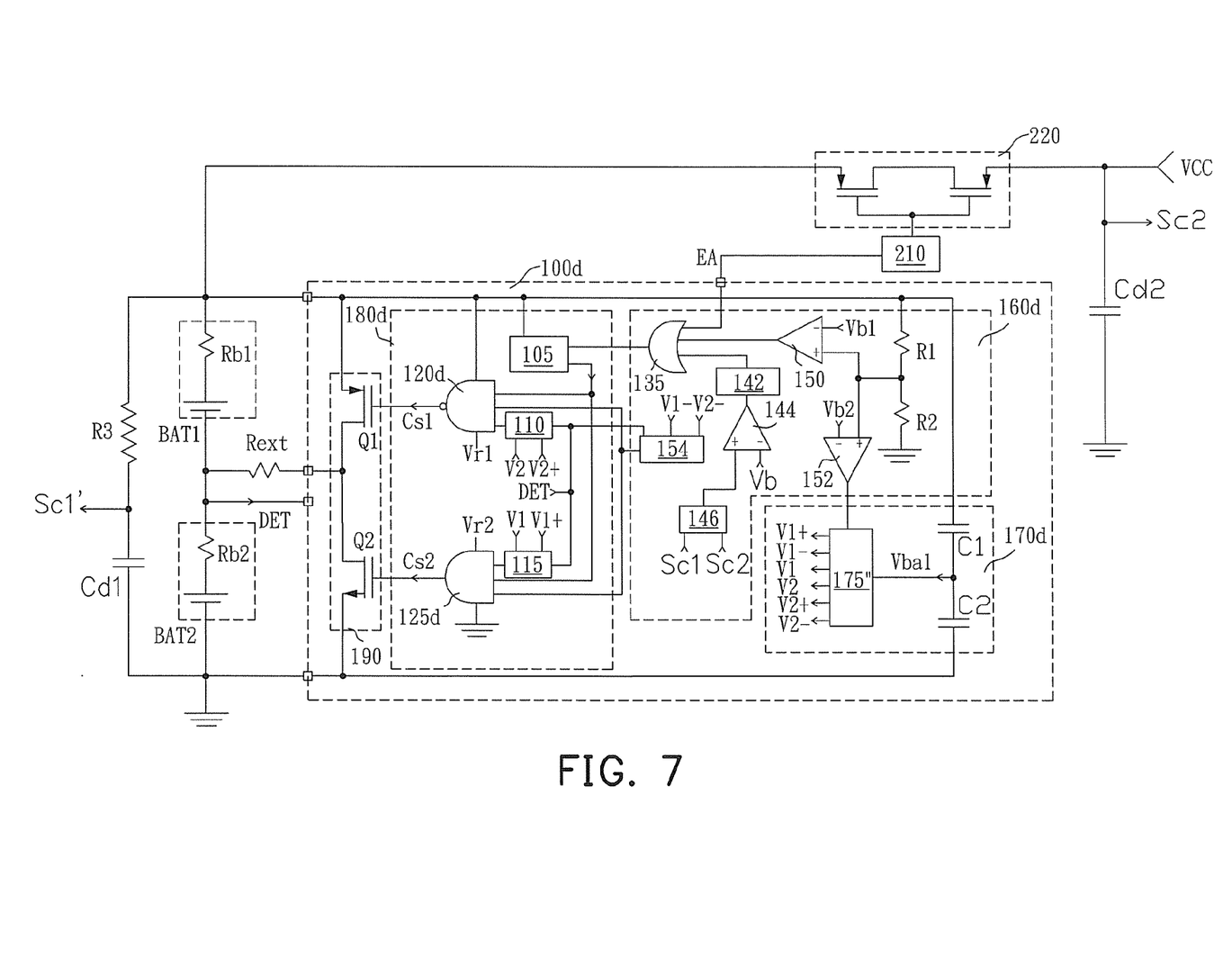
FIG. 7 is a schematic diagram illustrating a circuit of a battery balance charging controller according to a fifth preferred embodiment of the present invention.

In addition, referring to FIG. 7, FIG. 7 is a schematic diagram illustrating a circuit of a battery balance charging controller according to a fifth preferred embodiment of the present invention. In order to further ensure the safety of the battery voltage balancing, in the embodiment illustrated of FIG. 7, the reference voltage generator 175' further generates an up protection reference voltage level V1− and a down protection reference voltage level V2−, wherein the up protection reference voltage level V1− is higher than the up high reference voltage level V1+, and the down protection reference voltage level V2− is lower than the down low reference voltage level V2+. If there is a too high voltage difference between the first battery BAT1 and the second battery BAT2, this represents that one of the batteries may be damaged or there are other major problems. At this time, a battery balance charging controller 100d may have to enter a protection state in order to stop the operation of the battery voltage balancing. Therefore, in this embodiment, a charging protection unit 160d further includes a protection determination unit 154, receiving the connection point voltage signal DET, the up protection reference voltage level V1− and the down low protection reference voltage level V2−, and generating a protection signal to a NAND gate 120d and an AND gate 125d of a balancing determination unit 180d when the connection point voltage signal DET is higher than the up protection reference voltage level V1− or lower than the down protection reference voltage level V2−, so as to stop the operation of the battery voltage balancing.

Figure 8:
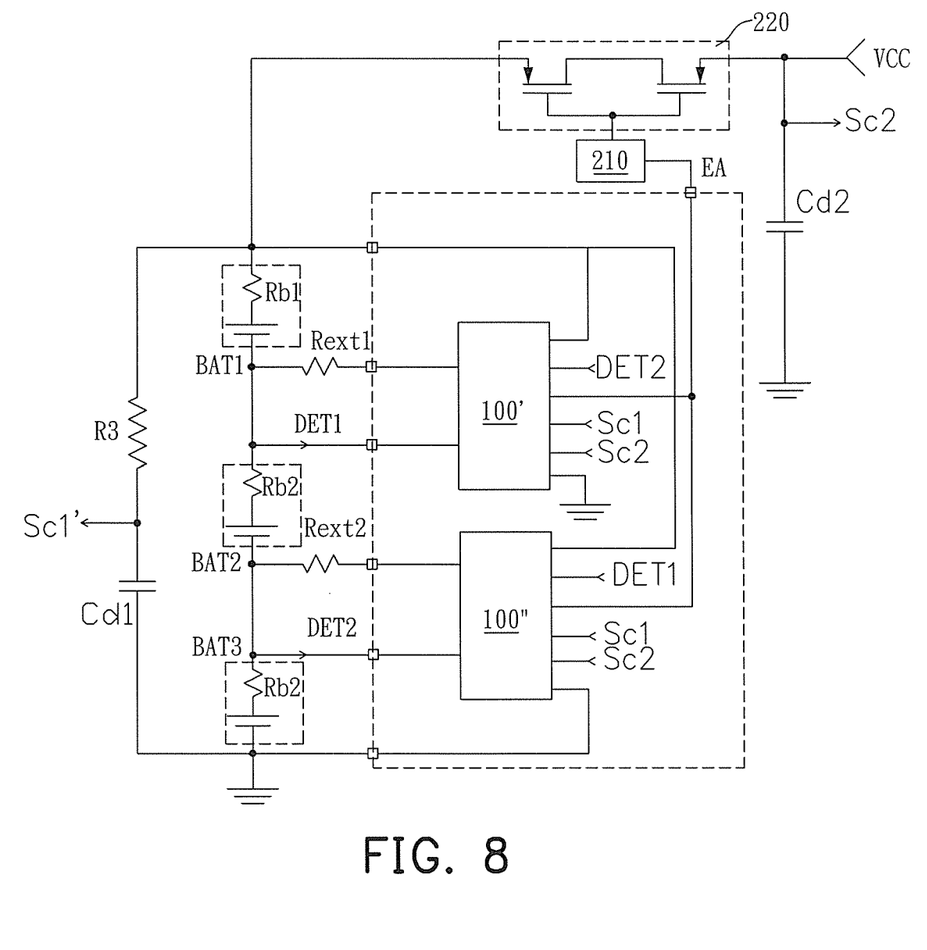
FIG. 8 is a schematic diagram illustrating a circuit of a battery balance charging controller according to a sixth preferred embodiment of the present invention.

In the following descriptions, the use of a description such as "A and/or B" refers to the meaning of "A and B" or "A or B", wherein A and B herein are just exemplary subjects. In addition to be applied to the battery voltage balancing between the two batteries, the battery balance charging controller may also be applied to the battery voltage balancing between three or more batteries. Referring to FIG. 8, FIG. 8 is a schematic diagram illustrating a circuit of a battery balance charging controller according to a sixth preferred embodiment of the present invention. In this embodiment, the battery balance charging controller may include two battery balance charging controller 100' and 100" (the battery balance charging controller 100' or 100" is one battery balance charging controller from the above-described embodiments), so as to correspond to any two batteries connected in series for carrying out the battery voltage balancing. When the voltage difference between the first battery BAT1 and the second battery BAT2 is higher than a first preset value but lower than a second preset value, and/or the voltage difference between the second battery BAT2 and the third battery BAT3 is higher than the first preset value but lower than the second preset value, wherein the first preset value is used for determining a battery balance charging status and the second preset value is used for determining a protection status, the battery balance charging controller 100' and/or the battery balance charging controller 100" then may adjust the magnitude of the charging current of the corresponding two batteries, so as to make the charging current of one battery unit having the lower voltage level out of the first battery BAT1, the second battery BAT2, and the third battery BAT3 greater than the charging current of the battery unit having the highest voltage level out of the above-described three batteries. Since operations of the battery balancing charging controller 100' and the battery balance charging controller 100" is the same as in the above-described embodiments, these will not be described again here.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. A battery balance charging controller, for balancing the charging of a first battery and a second battery, wherein a negative terminal of the first battery is connected with a positive terminal of the second battery to form a connection point, a positive terminal of the first battery forms a first terminal, a negative terminal of the second battery forms a second terminal, the battery balance charging controller comprising:
a battery reference voltage generating unit, for providing a first set of battery balancing determination signals and a second set of battery balancing determination signals, wherein the first set of battery balancing determination signals comprises an up high reference voltage level and an up low reference voltage level, and the second set of battery balancing determination signals comprises a down low reference voltage level and a down high reference voltage level, wherein the up high reference voltage level is higher than the up low reference voltage level, and the down low reference voltage level is lower than the down high reference voltage level;
a voltage balancing unit, including a first balancing electric current unit and a second balancing electric current unit, wherein the first balancing electric current unit is coupled to the first terminal and the connection point, and the second balancing electric current unit is coupled to the second terminal and the connection point; and
a balance judging unit, coupled to the connection point, the battery reference voltage generating unit, and the first and the second balancing electric current units of the voltage balancing unit, for controlling, when a voltage level of the connection point is higher than the up high reference voltage level, the first and the second balancing electric current units of the voltage balancing unit so as to make one battery having a lower voltage out of the first battery and the second battery to receive a greater charging current until a voltage level of the connection point is equal to the up low reference voltage level, or for controlling, when the voltage level of the connection point is lower than down low reference voltage level, the first and the second balancing electric current units of the voltage balancing unit so as to make one battery having the lower voltage out of the first battery and the second battery to receive the greater charging current until the voltage level of the connection point is equal to the down high reference voltage level.

2. The battery balance charging controller as claimed in claim 1, further comprising:
a charging protection unit, coupled to the battery reference voltage generating unit and the connection point, wherein the first set of battery balancing determination signals further comprises an up protection reference voltage level, the second set of battery balancing determination signals further comprises a down protection reference voltage level, the up protection reference voltage level is higher than the up high reference voltage level, the down protection reference voltage level is lower than the down low reference voltage level, and the charging protection unit outputs a protection signal, when the voltage level of the connection point is higher than the up protection voltage level or the voltage level of the connection point is lower than the down protection voltage level, so as to make the battery balance charging controller to enter a protection state.

3. The battery balance charging controller as claimed in claim 1, wherein the up low reference voltage and the down high reference voltage are equal potential.

4. The battery balance charging controller as claimed in claim 2, wherein a resistor is coupled to the connection point and the voltage balancing unit.

5. The battery balance charging controller as claimed in claim 2, wherein the charging protection unit outputs a charging signal when a charging current signal, representing the charging current, is higher than a preset current value, so as to activate the balance judging unit.

6. The battery balance charging controller as claimed in claim 5, wherein the charging protection unit comprises a voltage difference processing unit, the voltage difference processing unit is coupled to a charging terminal and a battery terminal of a protection switch module, the battery terminal of the protection switch module is coupled to the first terminal, the charging terminal is coupled to a charging source, and the voltage difference processing unit generates the charging current signal according to voltage levels of the charging terminal and the battery terminal.

7. The battery balance charging controller as claimed in claim 6, wherein the battery terminal of the protection switch module is coupled to a filter circuit, and the filter circuit is coupled between the first terminal and the second terminal.

8. The battery balance charging controller as claimed in claim 5, wherein the charging protection unit further detects a voltage difference between the first terminal and the second terminal, and outputs the charging signal when the voltage difference between the first terminal and the second terminal is higher than a preset activation voltage.

9. The battery balance charging controller as claimed in claim 8, wherein the charging protection unit outputs an adjustment signal, when the voltage difference between the first terminal and the second terminal is higher than a preset adjustment voltage, so as to adjust levels of the up high reference voltage level and the down low reference voltage level output from the battery reference voltage generating unit.

10. A battery charging controlling apparatus, for charging a battery module comprising a plurality of battery units connected in series, wherein the battery charging controlling apparatus is coupled to a positive terminal and a negative terminal of each of the battery units, the battery charging controlling apparatus comprising:
a battery charging controlling unit, for controlling magnitude of a charging current of the battery module according to a battery current detection signal and a battery voltage detection signal; and
a battery balance charging controlling unit, coupled to the positive terminal and the negative terminal of each of the battery units, for determining a voltage difference between any two adjacent battery units of the battery module, and executing a balance charging control to adjust the magnitude of the charging currents of the two battery units when the voltage difference between any two adjacent battery units of the battery module is higher than a first preset value or lower than a second preset value, so as to make the charging current of one battery unit with a lowest voltage level out of the plurality of battery units greater than the charging current of one battery unit with a highest voltage level, wherein the battery balance charging controlling unit adjusts the magnitude of the charging current until a voltage difference between any two adjacent battery units of the battery module is lower than a third preset value, and the third preset value is less than the first preset value.

11. The battery charging controlling apparatus as claimed in claim 10, wherein the battery balance charging controlling unit enters a protection mode when the voltage difference between any two adjacent battery units of the battery module is higher than the second preset value.

12. The battery charging controlling apparatus as claimed in claim 10, wherein the battery charging controlling unit generates an activation signal, and the battery balance charging controlling unit executes the balance charging control after receiving the activation signal.

13. The battery charging controlling apparatus as claimed in claim 12, wherein the battery charging controlling unit comprises a first charging mode and a second charging mode, and the battery charging controlling unit generates the activation signal under the first charging mode, wherein an average current magnitude of the charging current during the first charging mode is greater than an average current magnitude of the second charging mode.

14. The battery charging controlling apparatus as claimed in claim 10, wherein the battery balance charging controlling unit detects the charging current, and activates the balance charging control when the charging current is greater than a preset current value.

15. The battery charging controlling apparatus as claimed in claim 14, further comprises a protection switch module, coupled between a charging source and the battery module, for transmitting the charging current provided by the charging source to charge the battery module according to a control of the battery charging controlling unit.

16. The battery charging controlling apparatus as claimed in claim 15, wherein the battery charging controlling unit is coupled to two terminals of the protection switch module so as to determine the magnitude of the charging current flow through the protection switch module.

17. The battery charging controlling apparatus as claimed in claim 16, further comprises a filter circuit coupled to the battery module and the protection switch module.

18. The battery charging controlling apparatus as claimed in claim 10, wherein the battery balance charging controlling unit detects a voltage of the battery module, and activates the balance charging control when the voltage of the battery module is higher than a preset activation voltage value.

19. The battery charging controlling apparatus as claimed in claim 18, wherein the battery balance charging controlling unit adjusts the first preset value when the voltage of the battery module is less than a preset adjustment voltage value, wherein the preset adjustment voltage value is higher than the preset activation voltage value.

20. A battery balance charging controller, for balancing the charging of a first battery and a second battery, wherein a negative terminal of the first battery is connected with a positive terminal of the second battery to form a connection point, a positive terminal of the first battery forms a first terminal, a negative terminal of the second battery forms a second terminal, the battery balance charging controller comprising:

a battery reference voltage generating unit, for providing a first set of battery balancing determination signals and a second set of battery balancing determination signals, wherein the first set of battery balancing determination signals comprises an up high reference voltage level, and the second set of battery balancing determination signals comprises a down low reference voltage level;

a voltage balancing unit, including a first balancing electric current unit and a second balancing electric current unit, wherein the first balancing electric current unit is coupled to the first terminal and the connection point, and the second balancing electric current unit is coupled to the second terminal and the connection point;

a balance judging unit, coupled to the connection point, the battery reference voltage generating unit, and the voltage balancing unit, for controlling the voltage balancing unit so as to make one battery having a lower voltage out of the first battery and the second battery to receive a greater charging current when a voltage level of the connection point is higher than the up high reference voltage level or the voltage level of the connection point is lower than the down low reference voltage level; and a charging protection unit, outputting a charging signal when a charging current signal, representing the charging current, is higher than a preset current value, so as to activate the balance judging unit.

21. The battery balance charging controller as claimed in claim 20, wherein the charging protection unit is coupled to the battery reference voltage generating unit and the connection point, the first set of battery balancing determination signals further comprises an up protection reference voltage level, the second set of battery balancing determination signals further comprises a down protection reference voltage level, the up protection reference voltage level is higher than the up high reference voltage level, the down protection reference voltage level is lower than the down low reference voltage level, and the charging protection unit outputs a protection signal, when the voltage level of the connection point is higher than the up protection voltage level or the voltage level of the connection point is lower than the down protection voltage level, so as to make the battery balance charging controller to enter a protection state.

22. The battery balance charging controller as claimed in claim 20, wherein the charging protection unit comprises a voltage difference processing unit, the voltage difference processing unit is coupled to a charging terminal and a battery terminal of a protection switch module, the battery terminal of the protection switch module is coupled to the first terminal, the charging terminal is coupled to a charging source, and the voltage difference processing unit generates the charging current signal according to voltage levels of the charging terminal and the battery terminal.

23. The battery balance charging controller as claimed in claim 22, wherein the battery terminal of the protection switch module is coupled to a filter circuit, and the filter circuit is coupled between the first terminal and the second terminal.

24. The battery balance charging controller as claimed in claim 20, wherein the charging protection unit further detects a voltage difference between the first terminal and the second terminal, and outputs the charging signal when the voltage difference between the first terminal and the second terminal is higher than a preset activation voltage.

25. A battery balance charging controller, for balancing the charging of a first battery and a second battery, wherein a negative terminal of the first battery is connected with a positive terminal of the second battery to form a connection point, a positive terminal of the first battery forms a first terminal, a negative terminal of the second battery forms a second terminal, the battery balance charging controller comprising:
- a battery reference voltage generating unit, for providing a first set of battery balancing determination signals and a second set of battery balancing determination signals, wherein the first set of battery balancing determination signals comprises an up high reference voltage level, and the second set of battery balancing determination signals comprises a down low reference voltage level;
- a voltage balancing unit, including a first balancing electric current unit and a second balancing electric current unit, wherein the first balancing electric current unit is coupled to the first terminal and the connection point, and the second balancing electric current unit is coupled to the second terminal and the connection point;
- a balance judging unit, coupled to the connection point, the battery reference voltage generating unit, and the voltage balancing unit, for controlling the voltage balancing unit so as to make one battery having a lower voltage out of the first battery and the second battery to receive a greater charging current when a voltage level of the connection point is higher than the up high reference voltage level or the voltage level of the connection point is lower than the down low reference voltage level; and
- a charging protection unit, coupled to the first battery and the second battery, wherein the charging protection unit detects a voltage difference between the first terminal and the second terminal, and outputs a charging signal when the voltage difference between the first terminal and the second terminal is higher than a preset activation voltage.

26. The battery balance charging controller as claimed in claim 25, wherein the charging protection unit is further coupled to the battery reference voltage generating unit and the connection point, the first set of battery balancing determination signals further comprises an up protection reference voltage level, the second set of battery balancing determination signals further comprises a down protection reference voltage level, the up protection reference voltage level is higher than the up high reference voltage level, the down protection reference voltage level is lower than the down low reference voltage level, and the charging protection unit outputs a protection signal, when the voltage level of the connection point is higher than the up protection voltage level or the voltage level of the connection point is lower than the down protection voltage level, so as to make the battery balance charging controller to enter a protection state.

27. The battery balance charging controller as claimed in claim 25, wherein the charging protection unit comprises a voltage difference processing unit, the voltage difference processing unit is coupled to a charging terminal and a battery terminal of a protection switch module, the battery terminal of the protection switch module is coupled to the first terminal, the charging terminal is coupled to a charging source, and the voltage difference processing unit generates the charging current signal according to voltage levels of the charging terminal and the battery terminal.

28. The battery balance charging controller as claimed in claim 27, wherein the battery terminal of the protection switch module is coupled to a filter circuit, and the filter circuit is coupled between the first terminal and the second terminal.

* * * * *